United States Patent [19]

Emmerson et al.

[11] 3,709,632
[45] Jan. 9, 1973

[54] BLADE TIP CLOSURE
[75] Inventors: Calvin W. Emmerson; Ronald P. Schwedland, both of Indianapolis, Ind.
[73] Assignee: General Motors Corporation, Detroit, Mich.
[22] Filed: Feb. 12, 1971
[21] Appl. No.: 115,105

Related U.S. Application Data

[63] Continuation-in-part of Ser. No. 850,522, Aug. 15, 1969, abandoned.

[52] U.S. Cl. ...................416/97, 416/229, 416/231
[51] Int. Cl. ...............................................F01d 5/08
[58] Field of Search............416/96, 97, 231, 229, 90

[56] References Cited

UNITED STATES PATENTS

| | | | |
|---|---|---|---|
| 2,620,885 | 12/1952 | Lampton et al. | 416/233 |
| 2,851,216 | 9/1958 | Scanlan et al. | 416/96 |
| 3,446,480 | 5/1969 | Emmerson et al. | 416/90 |
| 3,560,107 | 2/1971 | Helms | 416/90 |
| 3,584,972 | 6/1971 | McGinnis et al. | 416/229 |
| 3,619,082 | 11/1971 | McGinnis | 416/97 X |

FOREIGN PATENTS OR APPLICATIONS

| | | | |
|---|---|---|---|
| 585,774 | 10/1959 | Canada | 416/96 |
| 591,117 | 4/1925 | France | 416/232 |

*Primary Examiner*—Everette A. Powell, Jr.
*Attorney*—Paul Fitzpatrick et al.

[57] ABSTRACT

A hollow laminated sheet metal transpiration-cooled porous turbine blade has its free end closed to prevent escape of cooling fluid from the end of the blade. This closure is made by separating the inner layer of the blade wall from the other layers and bending it inward from each face of the blade so that the inner layers from each face of the blade meet approximately along the mean camber line of the blade, where they are welded together to provide the closure. The closure is spaced from the blade tip, located within the cooled blade walls.

2 Claims, 5 Drawing Figures

PATENTED JAN 9 1973 3,709,632
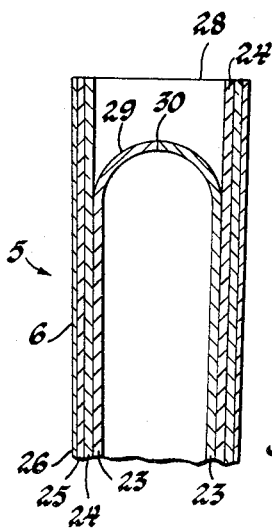
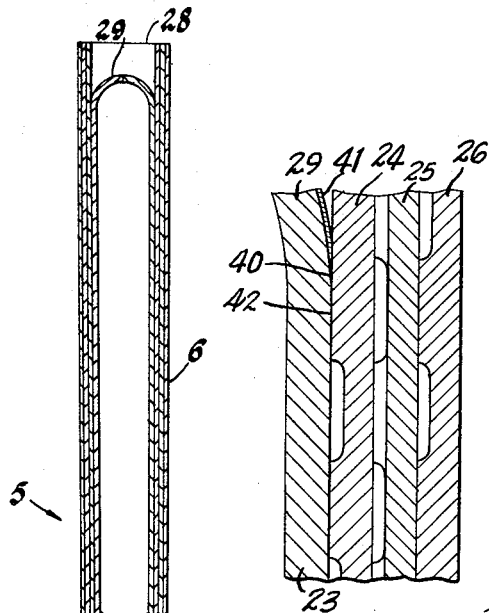
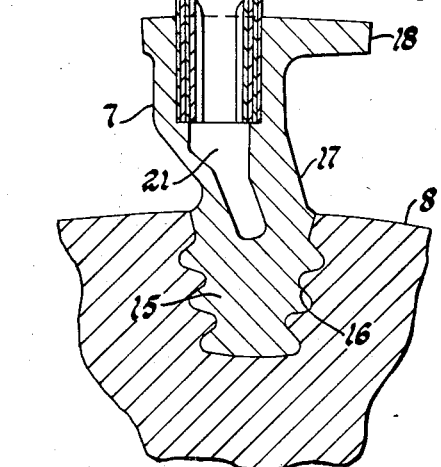
Fig.1
Fig.2a
Fig.2
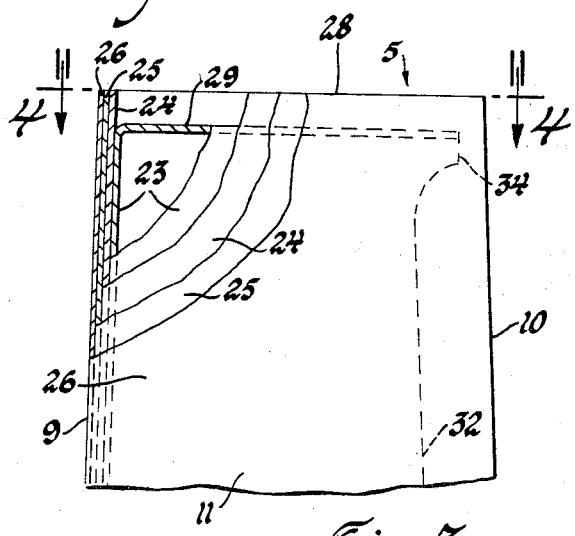
Fig.3
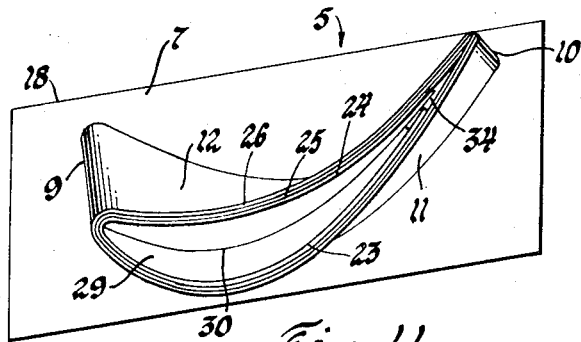
Fig.4
INVENTORS
Calvin W. Emmerson &
BY Ronald P. Schwedland
Paul Fitzpatrick
ATTORNEY

BLADE TIP CLOSURE

DESCRIPTION

This application is a continuation-in-part of our application Ser. No. 850,522 filed Aug. 15, 1969 (now abandoned).

The invention herein described was made in the course of work under a contract or subcontract thereunder with the Department of Defense.

Our invention relates to cooled airfoils such as turbine blades which are of a laminated metal structure and particularly to an improved closure for the end of such an airfoil.

There are prior disclosures of turbine vanes or blades cooled by transpiration of air from within through a wall of a porous nature. Such cooled turbine blades in which the wall is laminated are shown in U.S. Pat. Nos. 3,554,663 and 3,584,972. In such a blade the cooling air enters through a passage at one end of the blade airfoil and transpires through the walls. The blade wall is made up of layers bonded together, and the air flows between the layers and through holes in the layers.

The outer or free end of the blade must be closed and, in the prior devices referred to, this closure is effected by the tip of a central strut or by a flat metal cap welded to the tip of the blade. We deem it preferable in many cases to dispense with the strut, and experience has shown that it is difficult to effect the weld of an end cap to the blade wall without losing the cooling capabilities of the material. Moreover, in extremely hot environments, as in stoichiometric engines, the welded end cap must be cooled efficiently to keep metal temperatures below the allowable limit. In addition, for better aerodynamic efficiency, it is preferable to have both faces of the blade extend out to the stationary rub strip or shroud so as to be as close as possible to minimize losses.

Our invention is directed to a new and, to the best of our knowledge, novel arrangement for closing or stopping the free end of the blade which is based upon our conception that such a closure may be effected by folding together the inner layer from each of the blade faces and welding them together below the blade tip where they meet approximately along the mean camber line of the blade to provide a lightweight closure. Thus, the closure is integral with the side wall of the blade. Also, the closure, including the weld, is in a sheltered and cooled environment within the blade walls.

In this connection, the closure according to our invention is roughly semicircular in cross section from face to face of the blade and, therefore, can resist the pressure contained within the blade and centrifugal force due to rotation of the turbine rotor in tension of the material rather than in shear, as is the case with the flat cap welded to the blade tip. As a result, there is economy of material and a saving in weight of the blade, which is very important in all cases to minimize stresses or reduce weight in a turbine rotor.

The principal objects of our invention are to provide an improved structure of a transpiration cooled airfoil such as a turbine blade, to provide an improved and lightweight closure for the end of a laminated blade or the like, to locate the end closure of a cooled hollow turbine airfoil within the cooled walls of the airfoil, and to provide an improved and more feasible method of closing the end of a turbine blade or the like.

The nature of our invention and its advantages will be apparent to those skilled in the art from the succeeding detailed description of the preferred embodiment of our invention and the accompanying drawings thereof.

FIG. 1 is a sectional view of a turbine rotor blade taken on a plane generally perpendicular to the axis of the rotation of the turbine and extending spanwise of the blade.

FIG. 2 is an enlarged view of the tip portion of the blade.

FIG. 2a is a greatly enlarged sectional view corresponding to a portion of FIG. 2.

FIG. 3 is a side elevation view of the tip of the blade, with parts cut away and in section.

FIG. 4 is a view of the tip of the blade taken on the plane indicated by the line 4—4 in FIG. 3.

Referring to the drawings, a turbine rotor blade 5 comprises an airfoil or fluid directing portion 6 and a base 7 which is attached to a turbine rotor 8. The airfoil 6 is a hollow folded sheet metal structure having a leading edge 9 and a trailing edge 10 connected by a convex or low pressure face 11 and a concave or high pressure face 12.

The blade base 7 comprises a dovetail root 15 which engages in a suitable dovetail slot 16 in the rotor 8. The base also comprises a stalk 17 and a platform 18. The platforms abut to define a boundary of the motive fluid path through the turbine when the blades are installed.

The base 7 is cast around the airfoil 6 to join the two, this being a matter which is of no moment to the present invention. The blade base defines an air entrance passage 21 which communicates with the open end of the airfoil 6.

Considering now the preferred structure of airfoil 6, it is a formed sheet metal wall defined by a number of thin metal layers bonded together. Specifically, these layers, as shown most clearly in FIG. 2, are an inner layer 23 and three layers 24, 25, and 26 successively to the outer surface of the wall. Preferably, each layer is about 0.010 of an inch thick and the layers are formed with numerous small non-registering perforations and with surface relief which provides for flow of cooling air admitted through the air entrance 21 within the blade wall and through the surface of the blade for transpiration cooling, generally as described in the above-noted prior applications. Specifically, cooling air entering the walls below closure 29 can flow spanwise of the blade through surface relief on the layers of the blade wall to the tip 28, thus cooling the wall all the way to the tip.

The layers are bonded together, as by diffusion bonding, prior to the forming of the laminated metal sheet into the airfoil shaped blade wall. This bonding takes place at local areas over the entire surface except adjacent the tip or closed end 28 of the blade where the outer end of the inner layer 23 is not bonded to the adjacent layer 24 for a distance sufficiently far from the end of the layer 23 that it may be bent over from each face of the blade to provide an arch from face to face of the blade as shown at 29, this providing a closure to prevent loss of the cooling air through the tip of the blade. After the inner layer is bent inward from each face of the blade in a generally curved or semicircular cross section with the edges abutting along a line 30, the edges are welded at 30 to perfect the seal and provide an arch which acts as a structure in tension to resist internal gas pressures and centrifugal forces due to rotation of the rotor. This is preferably accomplished by laser beam welding. Note that this closure is sheltered by the further projecting outer layers of the blade wall and cannot be welded by conventional means.

The inner layer 23 may terminate somewhat short of the trailing edge of the blade at a rear edge shown at 32 in FIG. 3. However, at the tip where the closure is effected, a small tab or ear 34 extends from each rear edge of the layer 23 into the angle where the two bases of the blade converge so that structure may be completely closed by a small amount of weld metal. It will be noted that this welding operation involves only the welding of very light sheets; it is remote from the surface of the blade which resists the gas loads due to the motive fluid; and, the structure of the closure being a domed or arch-like structure is suited to withstand the internal gas pressures and the centrifugal force notwithstanding the light gauge of the material.

The tip or outer edge portion of layer 23 can be prevented from bonding to the adjacent layer 24 by providing a stop-off between these layers during the bonding operation. It has been found preferable to etch the surface of the layer 23 which faces layer 24 to a depth of about one ten thousandth to three ten thousandths inch to provide a space for the stop-off material and a definite step at the edge of the stop-off. By providing this step or pocket for the stop-off, the stop-off does not prevent intimate contact of the two layers in a chordwise-extending strip immediately adjacent to the unbonded area. In this strip there is a continuous bond to prevent leakage between layers 23 and 24 out the blade tip.

Referring to FIG. 2a, which is a great enlargement of the structure shown in FIGS. 1 and 2, a portion of the arch 29 at the outer end of layer 23 is illustrated and layers 23, 24, 25, and 26 are shown as bonded together and having surface relief generally as described in the patents referred to above. The outer face of layer 23 has been etched to a depth of about one to three ten thousandths of an inch (necessarily exaggerated in the drawing) above the spanwise extending line 40 indicated in FIG. 2a and the coating or stop-off material is indicated at 41. The continuous bond to prevent leakage between layers 23 and 24 is in the area indicated by 42 in FIG. 2a.

It is preferred that the inner layer 23 extend into the base of the blade, but it might be spaced from the base, if it overlaps layer 24 sufficiently for a good retentive bond and the other layers have sufficient strength to resist the centrifugal pull on the inner layer and closure 29.

Also, the inner layer 23 may in some cases be of a more ductile material than the other layers, as it is the coolest layer of the blade wall.

It will be apparent to those skilled in the art that the structure described and the mode of providing it are particularly suited to attain the objects stated above and to provide a substantial improvement in transpiration-cooled turbine blades.

The detailed description of preferred embodiments of the invention for the purpose of explaining the principles thereof is not to be considered as limiting or restricting the invention, as many modifications may be made by the exercise of skill in the art.

We claim:

1. A turbine blade or the like comprising a hollow airfoil closed at one end and having two faces, the airfoil being defined by a wall of formed laminated sheet metal of a porous character adapted for flow of a cooling fluid into the open end of the airfoil and out through the wall for transpiration cooling of the airfoil, the wall comprising an inner layer and one or more layers exterior to the inner layer, the layers being bonded together over the major portion of the wall, the end portion of the inner layer of each face at the closed end of the airfoil being free from the other layers and being formed into a closure in the form of an arch of generally semicircular cross-section extending from one face to the other defined by the said end portions of the inner layer extending inwardly from each face into sealed butt joined contact with the said end portions of the inner layer of the other face.

2. A turbine blade or the like comprising a hollow airfoil closed at one end and having two faces, the airfoil being defined by a wall of formed laminated sheet metal of a porous character adapted for flow of a cooling fluid into the open end of the airfoil and out through the wall for transpiration cooling of the airfoil, the wall comprising an inner layer and one or more layers exterior to the inner layer, the layers being bonded together over the major portion of the wall, the end portion of the inner layer of each face at the closed end of the airfoil being free from the other layers and being formed into a closure in the form of an arch of generally semicircular cross-section extending from one face to the other defined by the said end portions of the inner layer extending inwardly from each face into sealed butt joined contact with the said end portions of the inner layer of the other face, the wall including a continuous sealing bond between the inner layer and the next adjacent layer at the closure to prevent leakage of the cooling fluid into the end of the airfoil between the said layers.

* * * * *